United States Patent [19]

Sugisawa et al.

[11] Patent Number: 4,539,903
[45] Date of Patent: Sep. 10, 1985

[54] FILLING APPARATUS

[75] Inventors: Ko Sugisawa; Kazuya Sekiguchi; Masao Taguchi; Masayuki Nakatani; Hitoshi Iwata, all of Higashiosaka, Japan

[73] Assignee: House Food Industrial Company Limited, Higashiosaka, Japan

[21] Appl. No.: 601,492

[22] Filed: Apr. 18, 1984

[30] Foreign Application Priority Data

Apr. 19, 1983 [JP] Japan .................................. 58-70803
Oct. 6, 1983 [JP] Japan ................................. 58-188928

[51] Int. Cl.$^3$ ............................................... A23L 3/00
[52] U.S. Cl. ....................................... 99/470; 99/483; 99/516
[58] Field of Search .................................. 99/467–474, 99/483, 484, 516, 534; 141/11, 82, 146; 53/440, 467; 422/11, 28, 25, 82, 304; 426/418, 615, 521, 397

[56] References Cited

U.S. PATENT DOCUMENTS 3,138,178  6/1964  Martin ............................. 99/483 X Primary Examiner—Timothy F. Simone
Attorney, Agent, or Firm—Weiss & Holloway

[57] ABSTRACT

A filling apparatus for charging a liquid or highly viscous product into containers. The apparatus has a pressurizing tank, buffer tank, filling tank and a filling machine. The tanks have controllable pneumatic internal pressure. The product is fed at a high pressure from the pressurizing tank to the buffer tank and, after decreasing the pressure in the buffer tank, the product is transferred at the normal or low pressure from the buffer tank to the filling tank and filling machine.

4 Claims, 4 Drawing Figures

FILLING APPARATUS

BACKGROUND OF THE INVENTION

1. Field of the Invention

The present invention relates to an apparatus for filling a liquid or highly viscous material into containers. More particularly, the invention concerns an apparatus capable of filling into containers, in a stable and continuous manner, a liquid or highly viscous product containing solid matter after treatment under a high pressure, while avoiding application of the high pressure to any part of the filler means. The invention is also concerned with a sterilizer making use of the filling apparatus.

2. Description of the Prior Art

In the fields of foodstuffs or medicines, it is a common measure to sterilize the products, before the products are sold commercially, to a state in which the products are amicobiologically safe, in order to prevent any putrefaction of the product by microorganisms during storage. The sterilization of the foodstuffs and medicines is preferably performed at a high temperature in a short period of time, in order to avoid any degradation of the quality which may occur during the sterilizing treatment.

When the sterilization of the product is performed at a high temperature exceeding 100° C., the product will be unfavourably boiled in the sterilization system if the treatment pressure is maintained at the normal level. In order to avoid such boiling, hitherto, it has been necessary to maintain a predetermined boil-suppressing pressure (referred to as "back pressure" hereinunder) within the sterilizing system. This conventional sterilizing method, however, has suffered from the following problems.

Namely, in one of the known sterilizing systems, two pumps are arranged upstream and downstream of the sterilizer as viewed in the direction of flow of the material under treatment, and the back pressure was obtained by suitably controlling the discharge rates of two pumps. In this system, however, the pump downstream of the sterilizer is subjected to a considerably high temperature or pressure if the sterilization temperature is raised to 120° to 150° C. which ensures a biologically safe sterilization. Consequently, a leak takes place in this pump to unstabilize the flow rate and pressure of the product in the sterilizer, resulting in a fluctuation of the treating condition.

Another known method for obtaining the back pressure employs a pressure control valve or a homogenizer in place of the downstream pump. In this case, if the product contains solid matter, the pressure control valve or the homogenizer tends to be clogged with this solid matter which would incur an extraordinary pressure rise in the system.

A sterilizing system suitable for the treatment of material containing solid matter and, hence, free from the problem of clogging is disclosed in a German magazine "Die Molkeri-Zeitung Welt der Milch, 35. Jahrgang, 1981/41). This system has a pressure feeding pump at the upstream side of the sterilizer and a back pressure tank disposed at the downstream side of the same. The back pressure tank has a controllable pneumatic pressure by which the back pressure is applied to the sterilizer. With this system, therefore, it is possible to treat the material containing solid matter in the sterilizer at a constant high temperature under a stable back pressure.

In addition, the problem concerning clogging can be avoided because there are no parts such as a pressure control valve or homogenizer which would be clogged with the solid matter.

The sterilization system shown in the above-mentioned magazine fully shows its merit particularly when the same is used in the sterlization of the material containing solid matter. In this sterilizing system, however, the following problem is encountered when a filling machine is connected to the downstream side of the back pressure tank because the same pressure as that acting in the sterilizer is applied also to the portion of the system downstream from the back pressure tank.

In general, the parts constituting the filling machine connected to the sterilizing system can withstand only comparatively low pressure so that the application of the same pressure as in the sterilizer to these parts of the filling machine is preferably avoided from the view point of mechanical engineering. The application of such pressure causes also various problems such as a fluctuation of the filling amount, "liquid dripping" due to leaking of the liquid product from the filling valve due to high pressure, and a splashing of the product resulting in a phenomenon called flushing when the filling valve is opened.

In this sterilizing system, therefore, a valve or a suitable means is disposed to selectively disconnect the filling machine from the sterilizer and the back pressure tank downstream from the sterilizer. In operation, the valve is closed to disconnect the filling machine during the sterilization and the sterilized product is temporarily collected in the back pressure tank without decreasing the pressure. Then, after stopping the operation of the sterilizer and dropping the pressure in the system portion including the back pressure tank, the valve is opened to allow the product to be fed to the filling machine. In this case, however, the sterilization and the filling have to be conducted in separate steps, which is quite inconvenient from the view point of continuous processing of the product.

In still another method, the pressure control valve or the product transferring pump is disposed between the back pressure tank in the sterilizing system and the filling machine. In this method, therefore, normal pressure is maintained in the system downstream from the pressure control valve or the pump, so that the filling machine is kept away from the pressure acting in the sterilizer. The use of the pressure control valve, however, tends to cause an abnormal pressure rise in the system due to clogging of the pressure control valve with any solid matter which may be contained in the product, often resulting in a breakdown of the sterilizing system. The containment of solid matter is permissible to some extent provided that the pump is used instead of the pressure control valve. In such a case, the solid matter is made to pass through various clearances existing in the pump, so that the solid matter is broken up. Thus, this method cannot be used suitable for products containing solid matter of large size.

Accordingly, the present invention intends as its primary object to provide a filling apparatus which is free from the problems of the prior art explained hereinbefore.

More specifically, it is a main object of the invention to provide a filling apparatus for filling into containers a liquid or highly viscous products treated at a high temperature and pressure to permit the filling of the product while avoiding the application of the high treating pressure to the parts of the filling machine.

Another object of the invention is to provide a filling apparatus which, when incorporated in a sterilizing system, permits a continuous high-temperature sterilization under a constant back pressure while avoiding application of excessive pressure to the parts of the filling machine, thereby to ensure a continuous and stable sterilization and filling.

A further object of the invention is to provide a filling apparatus which is improved to permit treatment of products even when the latter contain solid matter of comparatively large size.

These objects of the invention are achieved by providing a process comprising the steps of: (1) treating the product under a high pressure and collecting the same in a pressurizing tank without decreasing the pressure, (2) transferring the product from the pressurizing tank into a buffer tank which is connected to the downstream side of the pressurizing tank, while maintaining the pressure in the buffer tank at a level the same as or slightly below the pressure in the pressurizing tank; (3) bringing, after disconnecting the buffer tank from the pressurizing tank and decreasing the pressure in the buffer tank, the buffer tank into communication with a filling tank downstream of the buffer tank and having beforehand a low internal pressure, thereby to transfer the product from the buffer tank to the filling tank; and (4) transferring the product to the filling machine through the steps of (1) to (3) above. With this process, it is possible to treat the product continuously under high pressure and collect it by a pressurizing tank without suspending the operation. In addition, by repetitiously taking the steps (2) to (4), it is possible to conduct a stable and continuous filling of the product without subjecting the filling machine to a severe pressure condition.

The present inventors also worked out a sterilizing system having, at the upstream side of the filling apparatus, a sterilizer and a feeding tank or a feeding pump for supplying the sterilizer with the product, and a pressurizing tank downstream from the sterilizer, the pressurizing tank having a controllable pneumatic internal pressure for applying the back pressure to the sterilizer. According to this arrangement, it is possible to stably and accurately control the back pressure because the back pressure is transmitted through the medium of the air. With this system, therefore, the products are sterilized under quite a stable condition. This advantage, in combination with the aforementioned stable and continuous filling operation of the filling apparatus, offers an extremely superior performance of the sterilizing filling apparatus.

The present invention also provides a filling apparatus comprising: a pressurizing tank; a buffer tank; filling tank; and a filling machine; the tanks having independently controllable internal pneumatic pressure, and being connected in series by transfer pipes having valve means.

BRIEF DESCRIPTION OF THE DRAWINGS

The invention will become more apparent from the following description of the preferred embodiments thereof illustrated in the accompanying drawings in which.

DESCRIPTION OF THE PREFERRED EMBODIMENTS

Figure 1:
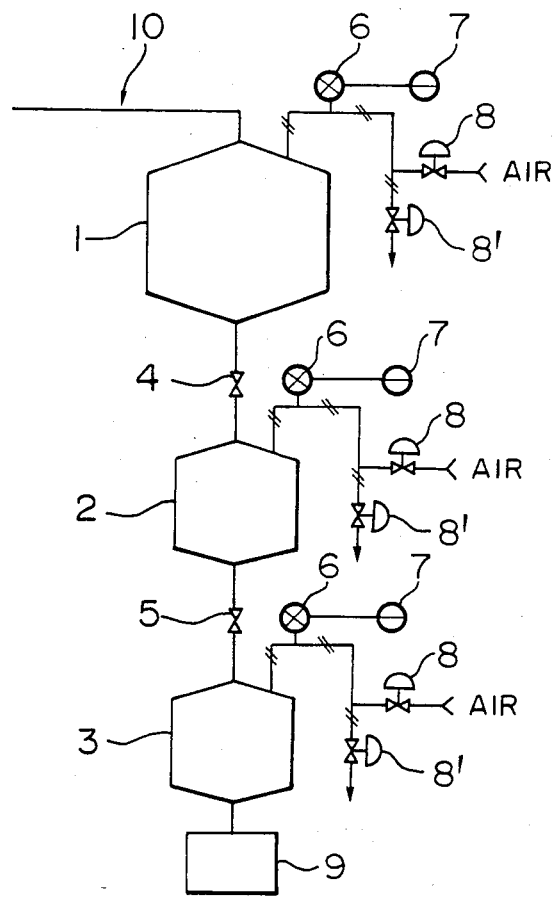
FIG. 1 is a schematic flow chart showing an embodiment of the filling apparatus in accordance with the invention.

Referring first to FIG. 1 which is a flow chart of a preferred embodiment of the filling apparatus of the invention, the filling apparatus has a pressurizing tank 1, a buffer tank 2, a filling tank 3 and a filling machine 9 which are connected in series in the mentioned order through a transfer pipe 10. The portions of the transfer pipe 10 between the pressurizing tank 1 and the buffer tank 2 and between the buffer tank 2 and the filling tank 3 are provided with valves 4 and 5, respectively.

In the operation of this apparatus, a product which has been treated under high pressure as in the case of, for example, a high-temperature sterilization, is fed to the pressurizing tank 1 without decreasing the high treating pressure. The pressurizing tank 1 is provided with a pressure sensor 6 and a pressure controller 7 which controls inlet and outlet valves 8 and 8' in response to the output of the pressure sensor 6 so as to maintain a constant gas pressure in the pressurizing tank 1. The pressurizing tank 1 may be of a pressure resistant construction and may have agitating function as desired. The control of the gas pressure in the pressurizing tank 1 may be conducted by air regulators. The gas filling the pressurizing tank 1 may be air, nitrogen gas, carbon dioxide gas and the like, as is the case of the buffer tank 2 and the filling tank 3 which will be detailed later. In the case where a perfect sterile condition is required, the gas should be an aseptic air which has passed, for example, a sterilizing filter (not shown).

When feeding the product under pressure to the tank 1, the valve 5 is closed, while the valve 4 is either closed or opened. When the valve 4 is kept opened, it is preferred that the gas pressure in the buffer tank 2 is controlled and maintained at the same level as or slightly below the gas pressure in the pressurizing tank 1, in order to prevent rushing of the product from the pressurizing tank 1 into the buffer tank 2 due to a large pressure difference between these tanks.

The product thus collected in the pressurizing tank 1 is fed to the buffer tank 2, as the valve 4 is opened after the internal pressure of the buffer tank 2 is regulated to the same level as the pressure in the pressurizing tank 1 or slightly below the same by controlling the valves 8 and 8'. As in the case of the pressurizing tank 1, the buffer tank 2 also is provided with a pressure sensor 6 and a pressure controller 7 (or air regulator) so that the pressure in the tank 2 is maintained constant. The buffer tank 2 may also be resistant to pressure and may have an agitating function as desired. The transfer of the product from the pressurizing tank 1 to the buffer tank 2 is effected by, for example, the force of gravity due to the fact that the buffer tank 2 is disposed below the pressurizing tank 1. Alternatively, the transfer of the product may be effected by maintaining the internal pressure of the buffer tank 2 at a level slightly below the internal pressure of the pressurizing tank 1.

If the product is required to be aseptic, the gas introduced into the buffer tank 2 also is required to be sterile air which has passed, for example, a sterilizing filter (not shown).

After a predetermined amount of product is collected in the buffer tank 2, the valve 4 is closed and the internal pressure of the buffer tank 2 is lowered down to a level ranging between, for example, normal pressure and 0.8 kg/cm$^2$ (gauge pressure), while the internal pressure of the filling tank 3 is maintained at the same level as the internal pressure of the buffer tank 2 or slightly below the same by controlling valves 8 and 8'. Subsequently, the valve 5 is opened so that the product is fed from the buffer tank 2 to the filling tank 3. As in the case of the pressurizing tank 1, the filling tank 3 is provided with a pressure sensor 6 or a pressure controller 7 (or an air regulator) so that the gas pressure in the tank is controlled and maintained at a constant level. The filling tank 3 may also be resistant to pressure and may have an agitating function as desired. If the product is required to be aseptic, the gas introduced into the buffer tank also has to be sterile air which has passed, for example, a sterilizing filter which is not shown. The pressures in the tanks 2 and 3 are preferably controlled by introduction of the sterile air into the tanks at a level somewhat higher than normal pressure in order to keep the interior of the apparatus in the sterile condition.

The transfer of the product from the buffer tank 2 to the filling tank 3 is effected by the force of gravity or pressure differential between the tanks, as in the case of the transfer from the pressurizing tank 1 to the buffer tank 2.

The product thus collected in the filling tank 3 is finally fed to the filling machine 9 by which the product is filled into, for example, containers. In this process, when the product is collected in the filling tank 3, the portion of the system downstream from the filling tank 3 has been depressurized to a predetermined pressure so that the filling machine 9 is protected against application of any excessive pressure. Therefore, the filling machine 9 is mechanically protected and the undesirable liquid dripping from the filling machine 9, as well as flushing of the product during filling operation and fluctuation of the filling amount, is avoided to ensure a stable filling of the product into, for example, the containers.

In the filling apparatus of the invention, the transfer of the product from the pressurizing tank 1 to the filling machine 9 past the buffer tank 2 and the filling tank 3 is conducted repeatedly so that the product which has undergone the treatment under high pressure is collected without interruption in the pressurizing tank 1, while the product is being continuously filled into the containers.

According to the invention, the product in the system does not pass through narrow clearances such as those in the pressure control valve or pump employed in the conventional system, the problem concerning the clogging with solid matter is avoided even if the product contains any solid matter.

Figure 3:
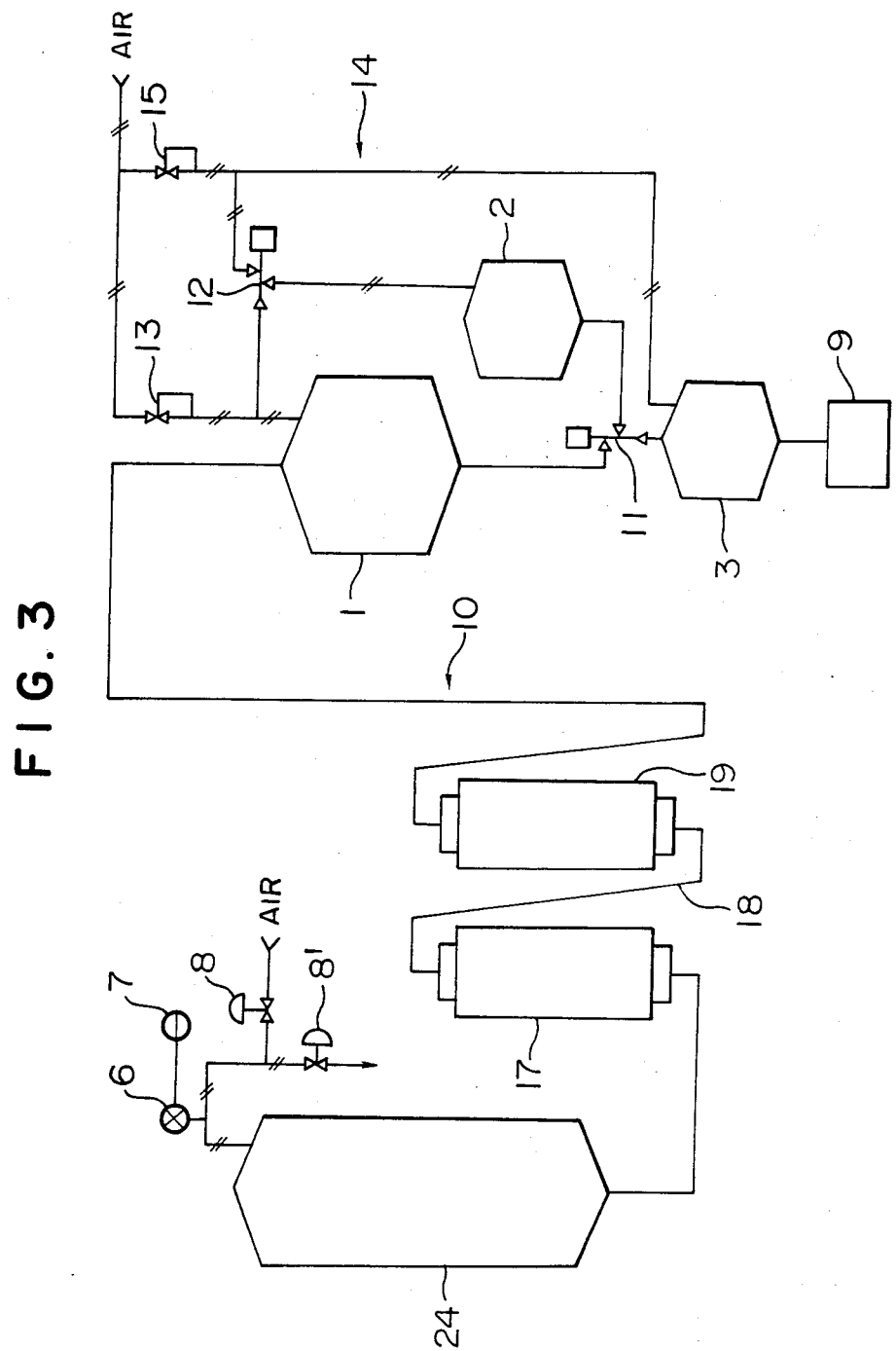
FIG. 3 is a schematic flow chart of a combination of another embodiment of the filling apparatus according to the invention with alternative sterilizing system.

FIG. 3 is a flow chart showing another preferred embodiment of the filling apparatus in accordance with the invention, in which essential parts are materially identical to those in FIG. 1.

A sterilizer sterilizes the product under the controlled gaseous back pressure in the pressurizing tank 1, as will be mentioned later, and the sterilized product is collected from the sterilizer into the pressurizing tank 1. In this case, a three-way valve 11 is used. When the product is received by the pressurizing tank 1, the three-way valve 11 takes a position for disconnecting the pressurizing tank 1 from the buffer tank 2 and the filling tank 3, while allowing the buffer tank 2 to communicate with the filling tank 3. The gas pressure in the buffer tank 2 is controlled by the air regulator 13. In this case, a three-way valve 12 disposed in the gas pipe 14 takes a position for disconnecting the pressurizing tank 1 from the buffer tank 2 and the filling tank 3.

Then, after collecting a predetermined amount of product in the pressurizing tank 1, the three-way valve 12 in the gas pipe 14 is operated to permit the pressurizing tank 1 to be communicated with the buffer tank 2 to control the internal pressure of the buffer tank 2 to the same level as that in the pressurizing tank 1. Subsequently, the three-way valve 11 is operated to open the passage between the pressurizing tank 1 and the buffer tank 2, while the latter is disconnected from the filling tank 3, thereby to allow the transfer of the product from the pressurizing tank 1 into the buffer tank 2.

After the collection of a predetermined amount of the product into the buffer tank 2, the three-way valve 12 in the gas pipe 14 is operated to close the passage between the pressurizing tank 1 and the buffer tank 2, while opening the passage between the buffer tank 2 and the filling tank 3, so that the internal pressure of the buffer tank 2 is decreased to a pressure of between, for example, normal pressure and 0.8 kg/cm$^2$ (gauge pressure). In this case, the control of the pressure is effected by the air regulator 15. Concurrently with this operation, the three-way valve 11 is operated to open the passage between the buffer tank 2 and the filling tank 3, while the pressurizing tank 1 is disconnected from the buffer tank 2, so that the product is transferred from the buffer tank 2 into the filling tank 3 and further to the filling machine 9 by which the product is filled into the containers.

Figure 2:
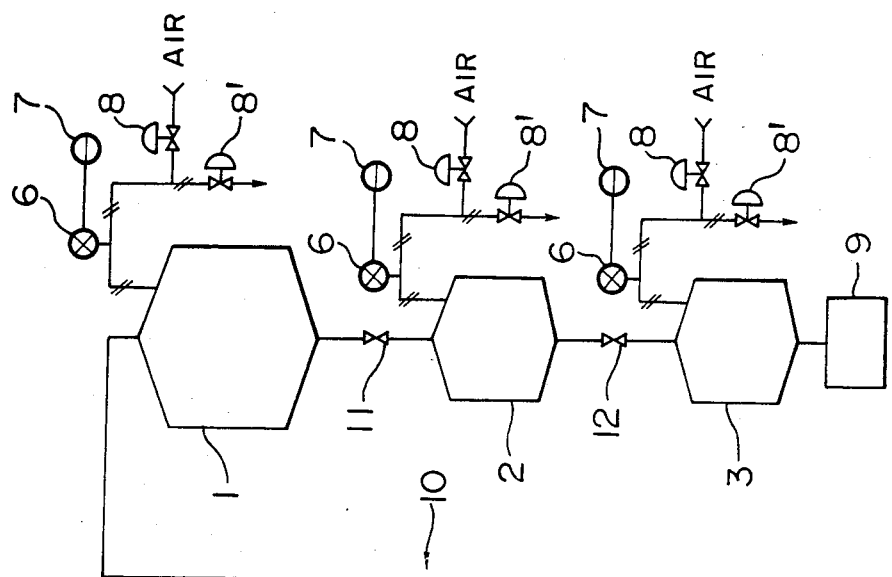
FIG. 2 is a schematic flow chart showing the filling apparatus according to the invention with an embodiment of a sterilizing system associated therewith.
Figure 2:
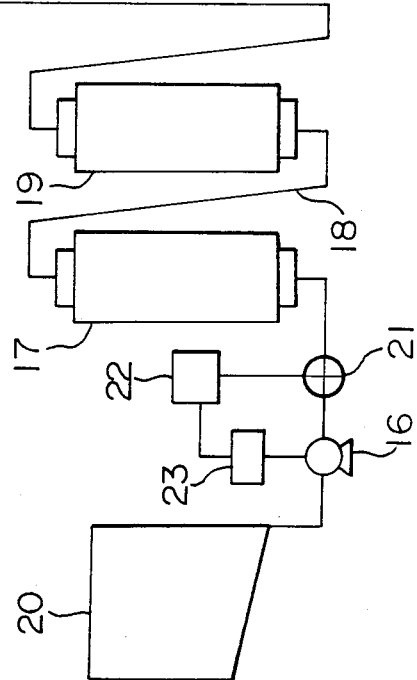

FIG. 2 is a flow chart of a preferred embodiment of a sterilizing filling system making use of the filling apparatus in accordance with the invention. In this sterilizing filling system, feeding means which may comprise a pump 16, sterilizer 17, holding tube 18, cooler 19 and the pressurizing tank 1 are connected in series in the mentioned order through a transfer pipe 10. The product is fed from a tank 20 through the system to the sterilizer 17 by means of the pump 16. The pump 16 is adapted to feed the product into the sterilizer at a suitable pressure. The pump 16 should have a discharge pressure at least higher than the back pressure from the pressurizing tank 1 and MONO-screw type pump, tubing type pump, rotary type pump or the like having a considerably good metering capability can suitably be used for this purpose. The control of flow rate of the product fed to the sterilizer 17 is conducted, for example, by detecting the flow rate of the product to the sterilizer 17 by a flow meter 21 disposed at the downstream side of the pump 16 and delivering the deviation of the measured flow rate from the set flow rate to a flow-rate controller 22, the flow-rate controller being adapted to deliver an instruction to an inverter 23 which in turn operates to change the operation speed of the pump 16, thereby to effect the control of the flow rate of the product.

As shown in FIG. 3 of the drawings, the feeding means may comprise a feeding tank 24 provided with a pressure sensor 6 and a controller 7 which cooperate with each other in controlling the internal pressure in the tank 24, and inlet and outlet valves 8 and 8'. The control of the gas pressure in the feeding tank 24 has to be made to maintain the same above the level of the gas pressure in the pressurizing tank 1, in order to ensure smooth transfer of the product through the sterilizer 12 into the pressurizing tank 1. In this case, the control of the flow rate of the product can be controlled by adjusting the pressure difference between the feeding tank 24 and the pressurizing tank 1.

Figure 4:
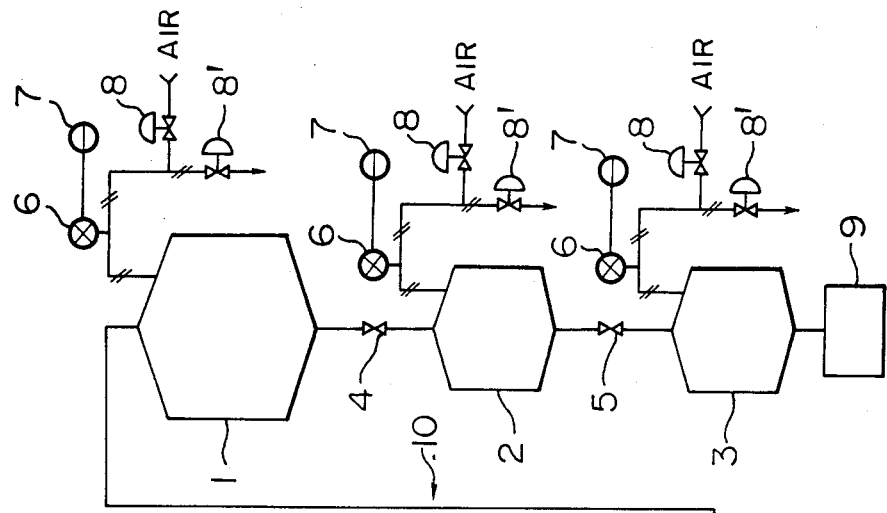
FIG. 4 is a schematic flow chart similar to that of FIG. 2, but showing a sterilizing system somewhat different from that of FIG. 3.
Figure 4:
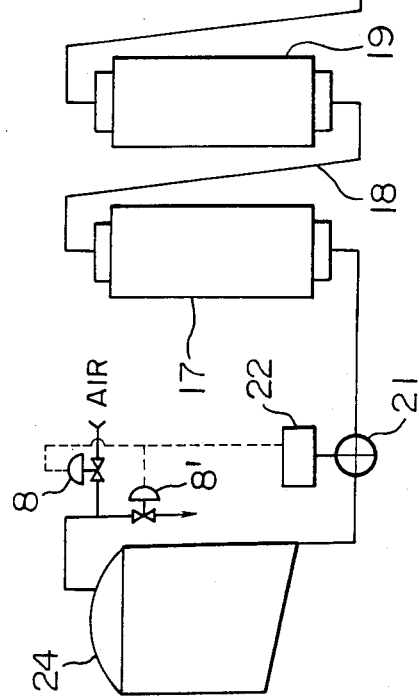

It is to be noted that, during the operation of the filling apparatus of the invention, the flow rate of the product may be changed due to variation in the product discharge pressure at the outlet of the tank 24 of the feeding means, as a result of the filling of the amount of the product in the tank of the feeding means, i.e., the height of the product in the tank of the feeding means. In such a case, as shown in FIG. 4, a flow rate control is conducted by, for example, detecting the flow rate of the product fed to the sterilizer 17 by means of a flow meter 21 disposed downstream of the feeding tank 24, and controlling the control valves 8 and 8' by means of a flow-rate controller 22 which operates in response to the output signal from the flow meter 21. The constant flow rate of the product can be maintained also by keeping a constant product discharge pressure at the outlet of the feeding tank 24, through operating the control valves 8 and 8' by means of a pressure controller (not shown) in response to a signal from a pressure sensor (not shown) provided in the portion of the transfer pipe 10 near the outlet of the feeding tank 24.

Various heat exchangers capable of effecting a short-time high-temperature treatment, e.g., a plate-type heat exchanger, tube-type exchanger, scraped-surface type heat exchanger and so forth, as well as a heater such as a steam injection type, can be used as the sterilizer 17 of the system of the described embodiment. It is possible to use two or more of these sterilizers in series. The use of the scraped-surface type heat exchanger having scraping function is specifically effective when the product is a highly viscous one or containing solid matter.

The product supplied to the sterilizer 17 is heated in the latter up to, for example, 130° to 150° C. After the heating, the product is held in a holding tube 18 for a predetermined time at a predetermined temperature which is selected to attain the desired sterilizing effect. Then, after cooling by the cooler 19 to a temperature down below, for example, 100° C., the material is introduced into the pressurizing tank 1. The cooler 19 may be a heat exchanger of, for example, plate type, tube type or scraped-surface type, the gas pressure controlled at a constant level in the pressurizing tank is applied to the product so as to force the same back to the tank 24 of the feeding means, so that a constant back pressure is applied to the sterilizer 17 to permit the successive treatment of the product at constant high temperature condition. In addition, since the product is fed into the sterilizer 17 by the gas pressure controlled in the feeding tank 24, the flow rate of the product flowing into the sterilizer is maintained strictly at a constant level. For these reasons, the back pressure applied to the sterilizer is highly stabilized advantageously. Furthermore, since the product is fed to the sterilizer 17 by the gas pressure in the feeding tank 24, there is no fear of breakage of the solid matter even when the product contains solid matter. However, when the product is required to be perfectly aseptic, the gas introduced into the pressurizing tank 1 has to be, for example, sterile air which has passed a sterilization filter (not shown). The sterile air may be used also as the gas which is supplied to the feeding tank 24.

The product, after being sterilized, thus is fed through the pressurizing tank 1, the buffer tank 2 and to filling tank 3 into the filling machine in the manner as previously described.

Needless to say, the sterilizing and filling apparatus of the invention can undergo an apparatus sterilization, water running and so forth, as is the case of the known apparatus.

As has been described, with the filling apparatus of the invention, it is possible to conduct a stable and continuous filling of the liquid or highly viscous product after treatment under a high pressure, without allowing the high treating pressure to be applied directly to the parts of the filling machine.

In particular, when the filling apparatus of the invention is incorporated in a sterilization system, it is possible to continuously sterilize the liquid or highly viscous product at high temperature under a predetermined back pressure, while avoiding application of excessive pressure to the filling machine, thereby to attain a stable and continuous sterilization and filling of the product. In addition, troubles attributable to the clogging by the solid matters and the breakage of the solid matters is eliminated even when the apparatus is used in the handling of a product containing solid matters of a comparatively large size. Thus, the invention can be used effectively particularly for the sterilization of liquid or highly viscous foodstuffs and medicines containing solid matter, as well as processing of such products by a sterile filling.

While the invention has been particularly shown and described with reference to preferred embodiments thereof, it will be understood by those skilled in the art that the foregoing and other changes in form and details may be made therein without departing from the spirit and scope of the invention.

We claim:

1. A filling apparatus for continuously treating a product under a high pressure and concurrently filling the treated product into containers in a stable and continuous manner, comprising:

pressurizing tank means having an internal pressure maintained at a high level for applying high pressure to apparatus disposed upstream thereof and for recovering the product under high pressure;

buffer tank means disposed downstream of said pressurizing tank means for collecting the product under high pressure from said pressurizing tank means and for passing the product downstream thereof under a pressure lower than the internal pressure of said pressurizing tank means or under an ambient pressure;

filling tank means disposed downstream of said buffer tank means for collecting the product from said buffer tank means and for passing the product downstream thereof;

filler means disposed downstream of said filling tank means for filling the product into said containers;

pressure control means for controlling the internal pressure of each of said pressurizing tank means, said buffer tank means and said filling tank means by a gas pressure;

transfer pipe means for connecting said pressurizing tank means, said buffer tank means, said filling tank means and said filler means to one another and for transferring the product; and valve means for opening and closing a first passage between said pressurizing tank means and said buffer tank means and for opening and closing a second passage between said buffer tank means and said filling tank means.

2. A sterilizing and filling apparatus for continuously sterilizing a product at a high temperature and under a high pressure and concurrently filling the sterilized product into containers in a stable and continuous manner, comprising:

feeding means for feeding the product downstream thereof under pressure;

sterilizer means disposed downstream of said feeding means for sterilizing the product at a high temperature;

pressurizing tank means disposed downstream of said sterilizing means having an internal pressure maintained at a high level for applying high pressure to apparatus disposed upstream thereof and for collecting the product under high pressure;

buffer tank means disposed downstream of said pressurizing tank means for collecting the product under high pressure from said pressurizing tank means and for passing the product downstream thereof under a pressure lower than the internal pressure of said pressurizing tank means or under an ambient pressure;

filling tank means disposed downstream of said buffer tank means for collecting the product from said buffer tank means and for passing the product downstream thereof;

filler means disposed downstream of said filling tank means for filling the product into said containers;

pressure control means for controlling the internal pressure of each of said pressurizing tank means, said buffer tank means and said filling tank means by a gas pressure;

transfer pipe means for connecting said pressurizing tank means, said buffer tank means, said filling tank means and said filler means to one another and for transferring the product; and valve means for opening and closing a first passage between said pressurizing tank means and said buffer tank means and for opening and closing a second passage between said buffer tank means and said filling tank means.

3. A sterilizing and filling apparatus according to claim 2, wherein said feeding means includes pump means for pumping the product under pressure into said sterilizer means.

4. A sterilizing and filling apparatus according to claim 2, wherein said feeding means includes pump means for controlling the internal pressure of said pressurizing tank means, said buffer tank means and said filling tank means and for pumping the product into said sterilizer means.

* * * * *